(12) United States Patent
Tricarico et al.

(10) Patent No.: US 8,519,296 B2
(45) Date of Patent: Aug. 27, 2013

(54) METHOD AND MACHINE FOR MACHINING PARTS USING SPARK-EROSION MILLING

(75) Inventors: Claudio Tricarico, Nyon (CH); Claude Rollet, Ornex (FR); Fabrice Jaques, Meyrin (CH); Jean-Claude Diot, St. Julien-en-Genevois (FR)

(73) Assignees: AGIE Charmilles SA, Losone (CH); Charmilles Technologies S.A., Meyrin (CH)

( * ) Notice: Subject to any disclaimer, the term of this patent is extended or adjusted under 35 U.S.C. 154(b) by 362 days.

(21) Appl. No.: 12/877,422

(22) Filed: Sep. 8, 2010

(65) Prior Publication Data

US 2011/0062118 A1   Mar. 17, 2011

(30) Foreign Application Priority Data

Sep. 9, 2009   (CH) ........................................ 1402/09

(51) Int. Cl.
*B23H 1/02* (2006.01)
*B23H 7/18* (2006.01)
*B23H 7/20* (2006.01)

(52) U.S. Cl.
USPC .................... 219/69.17; 219/69.16

(58) Field of Classification Search
USPC ........ 219/69.17, 69.16, 69.2, 69.12; 700/162
See application file for complete search history.

(56) References Cited

U.S. PATENT DOCUMENTS

| | | | |
|---|---|---|---|
| 3,591,761 A * | 7/1971 | Bederman et al. | 219/69.2 |
| 5,354,961 A | 10/1994 | Diot et al. | |
| 5,438,178 A | 8/1995 | Buehler et al. | |
| 5,763,843 A * | 6/1998 | Yuzawa et al. | 219/69.13 |
| 6,924,453 B2 * | 8/2005 | Kawahara et al. | 219/69.12 |
| 6,998,561 B2 * | 2/2006 | Kato et al. | 219/69.12 |
| 7,039,490 B2 * | 5/2006 | Kurihara et al. | 700/162 |
| 7,888,617 B2 * | 2/2011 | Hiraga et al. | 219/69.12 |
| 2002/0162824 A1 * | 11/2002 | Tricarico et al. | 219/69.17 |
| 2006/0138092 A1 * | 6/2006 | Chen et al. | 219/69.13 |

FOREIGN PATENT DOCUMENTS

| | | | |
|---|---|---|---|
| DE | 19654964 B4 * | 1/1998 | |
| EP | 0555818 | 8/1993 | |
| JP | 10-006 139 A * | 1/1998 | |
| JP | 10-128624 A * | 5/1998 | |
| JP | 11-048043 A * | 2/1999 | |

* cited by examiner

*Primary Examiner* — Geoffrey S Evans
(74) *Attorney, Agent, or Firm* — Bachman & LaPointe, P.C.

(57) ABSTRACT

A method and machine to allow for the spark-erosion machining of parts, in particular their finishing, using cylindrical or tubular tools by successive layers.

29 Claims, 7 Drawing Sheets

METHOD AND MACHINE FOR MACHINING PARTS USING SPARK-EROSION MILLING

BACKGROUND OF THE INVENTION

The invention relates to a spark-erosion machining method and to a machine implementing:
- a machining gap, situated between a tool electrode and a part, both conductors of electricity, a gap within which a multitude of erosive electrical discharges are generated, constituting a machining edge which is displaced according to the movements of the tool electrode,
- a dielectric medium present within the machining gap,
- said tool electrode being of cylindrical or tubular shape, moved along a number of axes of the machining machine relative to the machining edge and the part, x
- a process regulator,
- a numerical control system for controlling the displacements of the various axes of the machining machine,
- a Nominal Trajectory of the tool electrode defined by means of a computer file supplied upstream of the numerical control system of the machining machine and consisting of a succession of linear segments defined relative to a part coordinate system X,Y,Z, this Nominal Trajectory describing a movement of the tool electrode relative to the part as it ought to proceed if no disturbance were to occur during the machining.

In this type of machining method, the cylindrical tool electrode is moved along a trajectory substantially parallel to the surface of the part which is to be machined. The method uses a cylindrical tool electrode upon which movements are imposed in order to avoid short-circuits, counteract the disturbance inherent in the method, compensate for wear and keep the tool in the vicinity of and as close as possible to the trajectory.

Spark-erosion or electrical discharge machining is performed by means of an electrode used as a tool. The electrode can have a particular shape in the case of penetration spark-erosion. It may also be a wire stretched between two guides.

In the present document, a cylinder or a tube is considered that is used as the tool, the end of which is displaced along and/or in the vicinity of a predetermined machining path, which generally consists of a number of linear segments. The direction of advance of the tool may change from one segment to the next. The present invention deals more particularly with the latter case in which a tool of cylindrical or tubular shape machines by spark-erosion using its end. The machining progresses by successive layers; each layer more or less following the exact shape of the part to be machined, the latter serving as a guide for the tool. Said method is commonly called "spark-erosion milling".

When machining parts using this method, because of the relatively high speeds of advance, there is a permanent risk of short circuits which stop the machining and can cause an abrupt collision between the tool and the part. When such a risk occurs, the tool must rapidly increase its separation from the part, more precisely widen its spark gap.

Commonly, these machining regulation movements are performed by forward or backward movements, and therefore by displacements of the electrode in the direction of the predetermined tool path. Such regulation movements are, in theory, possible also when finishing parts when the layer to be machined is very thin. The drawback in these working conditions however consists in that, to obtain a sufficient modification of the width of the gap, it will be necessary to perform considerably greater movements by moving backward on the predetermined tool path. Such movements of large amplitude cannot be performed fast enough because of the inertia of the elements of the machine tool supporting the tool; furthermore, in finishing operations, the width of the gap is not substantially modified by movements in the direction of advance on the main trajectory, considerably reducing the effectiveness of these movements.

The patent EP 0 555 818 discloses a similar machining method, notably characterized by the fact that the gap is situated in the same direction as the tool path, which poses stability problems when machining layers of small thickness with ongoing risks of collision that would be fatal to the tool. Also, the tool is subject to ongoing wear and must be brought closer to the part to be machined during its travel along the predetermined trajectory so as to compensate for said wear. The wear is compensated for by an ongoing downward advance of the Z axis of the machine and there is no provision for reorienting said advance during the travel of the tool.

The U.S. Pat. No. 5,438,178 describes a spark-erosion machining method using a wire electrode, in which the issue is to refine the lateral surface roughness of a part which did undergo a relative displacement from the position that it occupied during the roughing operation. Despite this displacement which is greater than the width of the machining gap, there is a desire to refine the surface roughness without having to reposition the part on the milling machine table.

The patent explains how the lateral surface of the part is to be used as a reference rather than forcing the tool (in this case an electrode wire) to precisely follow a predetermined trajectory. Deformation phenomena occur when the stresses internal to the material are released by the passage of the wire in direct cutting mode; to which are added the result of the thermal drifts. Consequently, it is no longer possible to define a precise trajectory with which to follow the outline of the part that has been preformed. Operation is similar to that of a measuring operation during which the tool would trace the surface of the part by following its outline. In the case explained by U.S. Pat. No. 5,438,178, the process regulator does not correct the position error of the tool in the direction of the normal to the surface.

This patent is representative of a typical issue in spark-erosion milling: in order to define a machining range, an ideal trajectory has to be programmed, bearing in mind that, for various reasons, the tool will not precisely follow said trajectory.

However, the patent U.S. Pat. No. 5,438,178 does not fully explain all the modalities according to which the tool must be distanced from said trajectory. Certain key aspects associated with spark-erosion milling cannot be deduced therefrom, notably:
- The exact role of the planned trajectory which cannot be totally forgotten during the travel of the tool, despite the fact that it is not strictly observed.
- The lateral surface of the part does not make it possible to deduce all the information needed to guide the tool during the finishing operation.
- The process regulator(s) must incorporate specific functionalities to guide the tool off-trajectory, notably in order to provide corrections.
- Phenomena other than the deformations of the part require the tool, during its travel, not to follow the planned trajectory. These are stresses imposed by the machining gap and the deformations of the electrode due to wear.

The object of the invention is to develop a method designed to allow for the spark-erosion machining of parts, in particular their finishing, using cylindrical or tubular tools by successive layers, and to eliminate the machining risks and drawbacks mentioned hereinabove.

SUMMARY OF THE INVENTION

The foregoing object is achieved by the method of the invention wherein information contained in the Nominal Trajectory is used to define at least two control vectors which orient, within the part coordinate system, at least two independent regulation movements, the first of said control vectors, or Gap Vector, defining the direction in which the numerical control system must perform a first regulation movement of the axes of the machining machine designed to maintain the removal of material, a second of said control vectors, or Position Vector, defining the direction in which the machining regulator must perform a second regulation movement of the axes of the machining machine to correct a tool electrode position error relative to the Nominal Trajectory, the respective amplitudes of the regulation movements being calculated in real time by the process regulator.

The tool electrode thus performs movements resulting from the vector summing of displacements along and/or in the vicinity of the Nominal Trajectory; said displacements being defined by at least two elementary and independent control vectors each of which individually regulates either the gap or the correction of the position errors. Such a configuration of the regulation movements can easily be manipulated because, in these conditions, respective displacements that were previously incompatible no longer interfere with one another because they have been made independent. Such arrangements will be implemented, in particular in finishing where very thin layers can be machined in a stable manner and at a relatively high speed of advance.

The instructions described in the invention make it possible to implement changes of direction in a more effective manner, in particular because the required regulation movements are minimized.

Preferably, the Position Vector does not include any vector component parallel to the Gap Vector and vice versa. A particularly effective regulation of the machining is thus obtained.

According to a preferred execution mode, a third control vector, or Wear Vector, is defined, making it possible to perform a third regulation movement intended to compensate for the wear of the tool, its definition being taken from the Nominal Trajectory.

Advantageously, a fourth control vector, or Advance Vector, orients the action of advancing the tool parallel to the Nominal Trajectory.

In a particular execution mode, the Gap Vector and the Wear Vector are colinear; in another execution mode, they are perpendicular and provision is made for the regulation movements of the gap to be able to be performed quasi-perpendicularly to the trajectory, thus making it possible to compensate for the wear of the electrode in a particularly simple manner.

There are other cases, in particular those in which the gap regulation action ideally applied at the centre of the machining area, in other words at the momentary centre of gravity of the place where material is being removed, is not oriented at a right angle relative to the tool path, but at a wide open angle. In such conditions, the invention provides for a particular configuration, in which the regulation movements take place in the direction of the momentary centre of the machining, and in which in particular the gap regulation movements are performed in an intermediate direction between the tool path and the axis of symmetry of the tool.

As already mentioned hereinabove, the movements of the tool are itemized by numerous preplanned and preprogrammed trajectory segments, the direction of which possibly varies from one segment to the next. Because of this, it is possible to determine, in such a modification of the orientation, the point at which the elementary regulation movements must be reoriented to correspond to the next segment. In particular, the bisecting line between two successive trajectory segments is used.

In these conditions, when the direction of the trajectory segments changes, it is simple to determine that the regulation movements are being performed at a certain angle relative to the trajectory as far as the end of the current segment and change direction on crossing a boundary defined by the bisecting line with the next segment. At this point, it is thus possible to avoid requiring the tool electrode to change position abruptly causing a collision that would be fatal for the tool.

The elementary regulation movements remain oriented most of the time at the same angle relative to the trajectory, but a change of orientation of these movements may occur a little before the final point of the current segment in order to correspond to that planned for the next segment. By proceeding in this way, there is an ongoing re-adaptation of the regulation movements; this makes it possible to eliminate the displacement instabilities of the tool electrode. When the tool is effectively maintained on the planned trajectory, the orientation transition of the elementary regulation movements oriented at a given angle, relative to the current segment, is performed at the point of intersection between the current segment and the next segment.

By virtue of the method described by the invention, it becomes possible, in surface machining in which the tool must more or less exactly follow the profile of the part, to maintain the spark gap at an optimum spacing, and to do so by subjecting said gap to regulation movements suited to the conditions encountered and do so in a way that is independent of the progression of the tool electrode on or in the vicinity of the programmed trajectory.

BRIEF DESCRIPTION OF THE DRAWINGS

Other advantages and features of the invention can be deduced from the dependant claims and from the following description, in which exemplary execution modes of the invention are explained in a detailed manner with reference to the figures.

DETAILED DESCRIPTION

In order to explain the invention in a detailed manner, a number of execution modes will be explained hereinbelow. However, first, it is necessary to define the following specific concepts: Nominal Trajectory, Control Vectors, Advance Vector, Gap Vector, Wear Vector, Position Error, Position Vector, Inter-Segment Bisecting Line.

Figure 1:
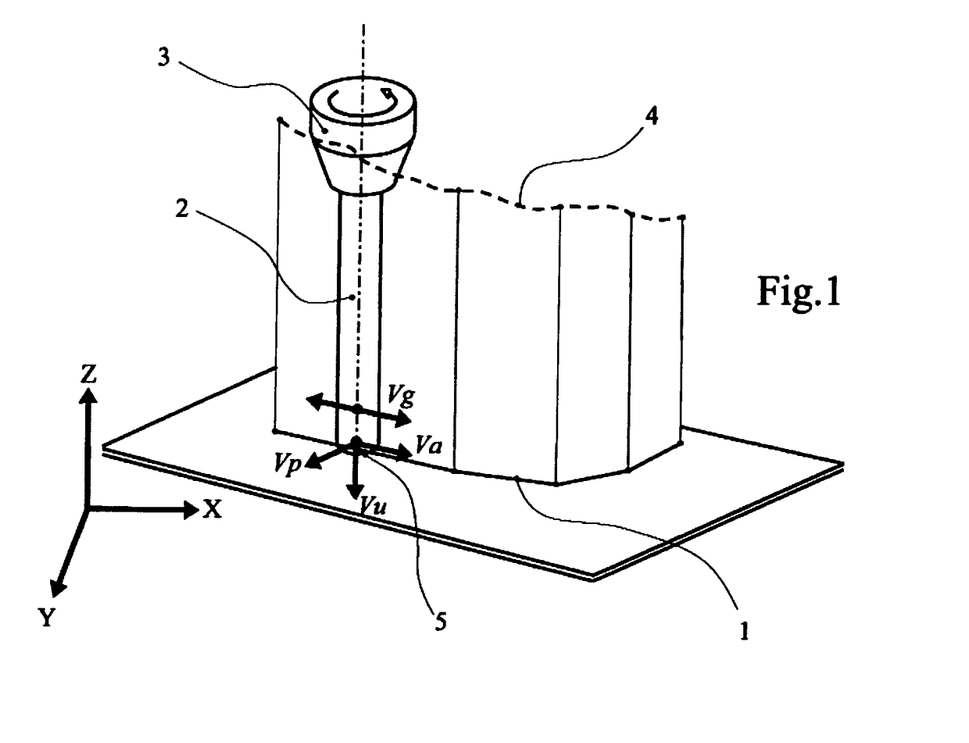
FIG. 1 is a perspective diagrammatic representation of a tool electrode of cylindrical shape rotating about its axis of symmetry and machining with its bottom end by following a nominal trajectory contained within a plane.

Referring to FIG. 1, the Nominal Trajectory is defined by means of a computer file supplied upstream of the machine's numerical control system; this is a succession of linear segments 1 or blocks defined relative to a part coordinate system X,Y,Z. The Nominal Trajectory describes, at each layer, the movement of the tool 2 as it ought to proceed if no disturbance were to occur during machining and if there were no tool wear. However, since there is usually wear, the tool holder 3, in order to compensate for this wear, must follow in real time a trajectory 4 which constantly drifts relative to the Nominal Trajectory 1, while the end of the tool 5, depending on the disturbances, remains more or less close to the Nominal Trajectory 1. The trajectory 4 of the tool holder 3, as driven by the numerical control system and the axes of the machine, therefore does not observe the Nominal Trajectory 1; this is an essential condition for compensating for the wear of the tool and ensuring that the real trajectory of the end of the tool (not represented) is as close as possible to the Nominal Trajectory 1.

Each block of this Nominal Trajectory 1 contains the definition of four distinct unitary vectors Va, Vg, Vu, Vp, or Control Vectors, which make it possible to respectively orient, within the part coordinate system XYZ, four independent regulation actions which will be defined below. However, if the respective orientation of such a control vector does not change relative to the preceding block, the information is not repeated.

In order to define the ideal travel schedule, each block of the Nominal Trajectory also comprises a mention of a duty longitudinal speed of advance or any other information that will make it possible to calculate in real time the speed that must be applied in the direction of the vector Va.

Figure 2:
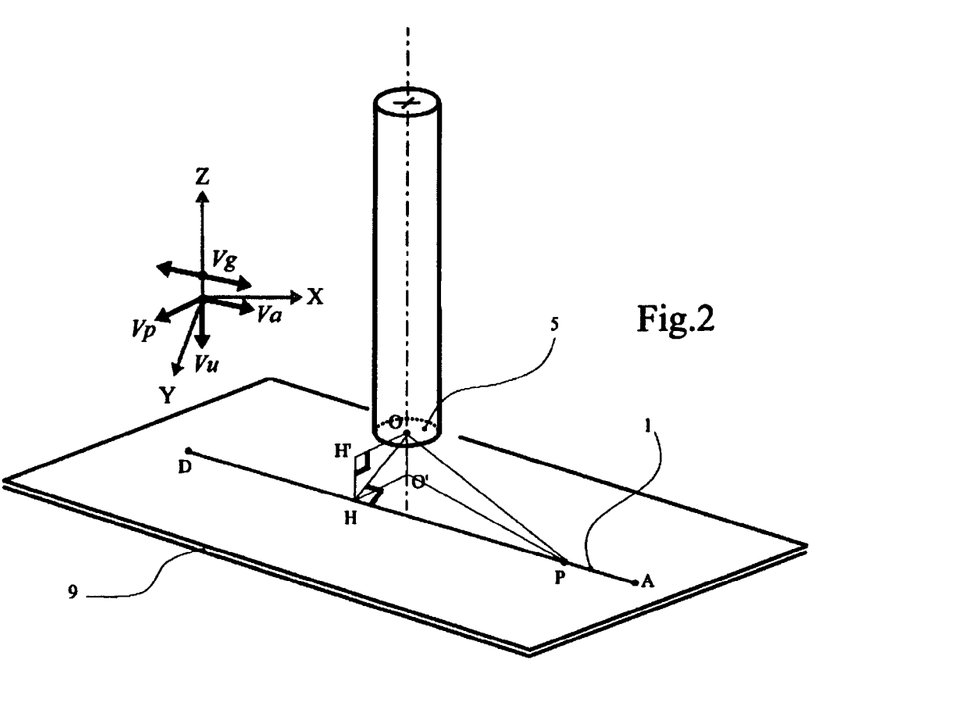
FIG. 2 is another perspective diagrammatic representation of a tool electrode of cylindrical shape, the bottom end of which deviates to a greater or lesser degree from the nominal trajectory.

With reference to FIGS. 1 and 2, in order to finely regulate the process according to the invention, four Control Vectors Va, Vg, Vu, Vp are distinguished, respectively Advance Vector, Gap Vector, Wear Vector and Position Vector. These are four unitary vectors which orient four regulation actions in the part coordinate system XYZ. The amplitude of said regulation actions is respectively determined by four associated scalars Ma, Mg, Mu, Mp.

The definitions of the vectors Va, Vg, Vu, Vp are contained explicitly or implicitly in each block of the Nominal Trajectory 1. The scalars Ma, Mg, Mu, Mp determine the respective amplitude of each of the regulation actions. They are calculated in real time by the process regulator and the numerical control system.

The Advance Vector Va generates the movement of the tool longitudinally or tangentially to the trajectory. Its orientation is defined by the data contained in the successive blocks of the Nominal Trajectory 1: in other words, according to FIG. 2, the point of arrival D of the preceding block and the point of arrival A of the current block. The vector Va is co-linear to the current trajectory segment DA. The scalar Ma associated with the vector Va is defined by the process regulator according to the duty speed value contained in the current block of the Nominal Trajectory, speed being adjusted in real time according to the local machining conditions.

Because of unexpected disturbances, the removal rate of material varies: this is why the travel schedule of the tool along the Nominal Trajectory is not precisely known in advance. Consequently, the longitudinal duty speeds of advance defined previously are never strictly observed.

Figure 3:
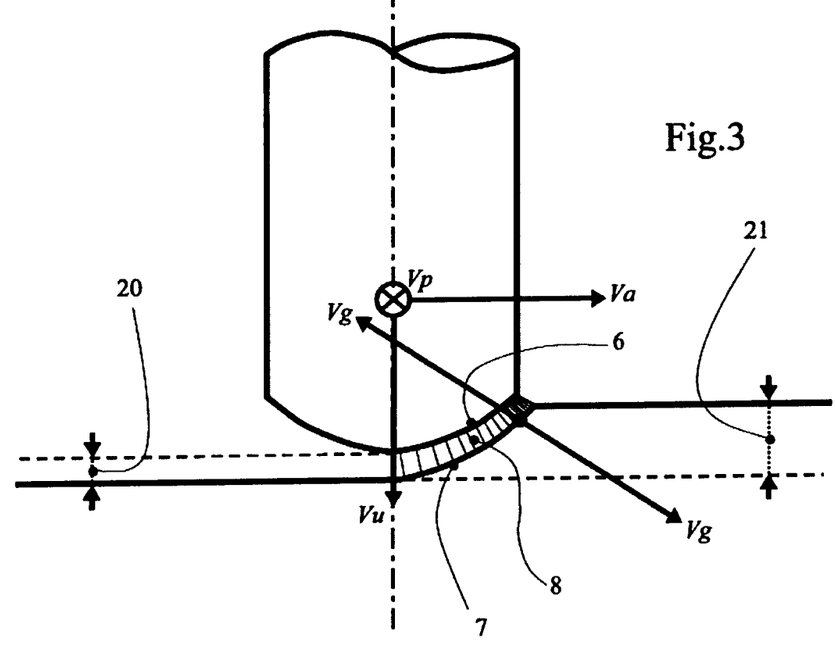
FIG. 3 is a vertical cross section parallel to the advance of a tool electrode of cylindrical shape machining with its bottom end; the figure highlights the conformation of the machining gap.

Referring to FIG. 3, consider a volume contained between two surfaces 6, 7 separated by a split or gap 8, similar to an electrical capacitor. The two surfaces 6, 7 are not usually flat. Sparks are generated anywhere from one pole to the other and pass through the gap 8 in a multitude of elementary vectors. The whole constitutes a machining edge which moves according to the movements of the tool electrode. The normalized sum of said elementary vectors during a short time period constitutes the Gap Vector Vg. This is an ideal vector attached to the momentary centre of gravity of the place where material is being removed. The direction in which this vector points indicates where the maximum risk of collision is situated.

The Gap Vector Vg defines the optimum direction in which the machining regulator must work in order to maintain the removal of material.

The scalar associated with the gap vector Mg is calculated in real time, with a high dynamic rate, by the process regulator according to measurements performed by an electrical sensor connected to the terminals of the machining gap. In most of the execution modes, the scalar Mg is characterized by a zero average, which is why the vector is symbolized in the figures by two opposing arrows.

The removal of material may cease abruptly if the width of the gap (or air gap) falls below a so-called short-circuit limit. If the speed of displacement of the tool relative to the part is great, the reaction time of the regulated system may be too long for the collision to be avoided. Since the tool is kept rapidly rotating, such a collision is often fatal for it.

An orientation error of 45° relative to the ideal Gap Vector can be tolerated; beyond that, the process regulator may totally lose its effectiveness and fail to establish the removal of material following a disturbance. Because of an unexpected and badly controlled local disturbance, the removal of material may cease abruptly, and cause a short circuit followed by a collision.

Hereinbelow we will be considering only the wear of a tool of cylindrical or tubular shape machining by its tip. It is known from the document EP 0 555 818 that the cutting profile of such a tool can be kept almost unchanging by machining in successive layers and by compensating for the wear of the tool in an ongoing manner in the direction of its axis of symmetry. However, according to this document, as already explained hereinabove, there is no provision made for varying its orientation during the travel. To eliminate this restriction, a control vector Vu, called Wear Vector, is defined co-linear to the axis of symmetry of the tool. This makes it possible, if necessary, to reorient this axis during the travel. According to the invention, the machining of the part is always performed by a stack of successive layers that are substantially parallel to one another, but said layers are not exclusively flat. In each step, the surface of the part guides the tool during the machining of the next layer, but the layer currently being machined is not the conformal copy of the preceding layer.

The Wear Vector Vu makes it possible to machine at the tip with a tool that is continuously losing its length by having its bottom point progress along a trajectory that is substantially parallel to the machined surface.

The scalar Mu associated with Vu is calculated in real time by the process regulator according to an evaluation of the machining efficiency on one electrode and the other. Referring to FIG. 2, the Gap Vector Vg points in a direction parallel to the direction of advance along the trajectory segment DA, Vg is therefore co-linear to Va in this particular case.

In its displacement in the vicinity of the trajectory segment DA, the end of the tool 5, more specifically its tool centre O, emphasizes, at each instant of its travel, a Position Error OP relative to the theoretical point P as defined by the theoretical schedule entered in the Nominal Trajectory 1.

The position of the point O is acquired by the numerical control system by means of the position measuring devices associated with the axes of the machine; for example, rules or angular coders.

This position error OP is broken down into three orthogonal vectors OH', H'H, HP such that OH'+H'H+HP=OP, with OH' being perpendicular to the axis of the tool and to the vectors Va and Vg, H'H being parallel to the axis of the tool and to the vector Vu, HP being parallel to the trajectory segment DA and to the vectors Va and Vg.

Gap control on the one hand and trajectory monitoring on the other hand are two regulation modules, part of the overall process control system, that have to work together with a high dynamic rate. The two modules are both characterized by passbands of around a hundred Hertz. It is essential for these two modules not to interfere with one another. Obviously, a correction of the position error may lead in certain cases to a gap width control defect with a fatal outcome. Conversely, an unexpected correction of the gap may result in an unwanted trajectory deviation which in turn is reflected on the gap, causing pumping between the two regulation modules. Slowing down one of these two modules relative to the other in order to prevent them from interfering with one another cannot be envisaged.

Consequently, to eliminate such a damaging effect, the invention proposes that the correction of the position error OP should not include any component parallel to the gap vector and vice versa.

Such a characteristic is implemented by placing the Position Vector Vp perpendicular to the Gap Vector Vg and by projecting the position error OP onto said Position Vector; said projection, which is the vector OH', makes it possible to calculate the scalar Mp associated with Vp according to the formula Mp=Kp. [OH'] in which [OH'] is the modulus of the vector OH' and Kp is the gain of the position error correction loop. According to this formula, the scalar Mp is therefore the product of the gain Kp of the Position Error correction loop by the modulus [OH'] of the orthogonal projection of the position error vector OP on the Position Vector Vp.

In other words, according to FIG. 2, a restriction is applied to the vector OP, following which only the component HO' of this vector is retained to activate the trajectory correction; the latter aiming to return the point O to the point H'.

HP is the orthogonal projection of OP onto DA, and represents a delay of the tool relative to the travel schedule planned in the definition of the Nominal Trajectory. Correcting this delay would lead to losses of control of the process with the appearance of collision risks and aberrations regarding the maintaining of the thickness of the machined layer. The component HP of the position error OP is therefore not corrected.

OO' is the orthogonal projection of OP onto Vu. Because of the wear of the tool and its compensation, OO' cannot be known precisely in real time; there is therefore no need to correct it either.

According to the execution modes of the invention, other orientations of the Position Vector Vp can be selected in order to ensure perfect machining stability.

Such a method, involving restricting the position error to its orthogonal projection onto the vector Vp, provides a considerable advantage: it becomes possible to give Kp a value that is as high as is permitted by the stability conditions of the position loop alone. If we observe the tool in the direction of its axis of symmetry, an extreme lateral rigidity, and therefore excellent accuracy, are obtained, as if the tool were guided by a rail on its trajectory. The gap regulation loop can also be made as much responsive as is permitted by the spark-erosion process considered separately. If the restriction as explained hereinabove is not applied, it is necessary both to reduce the position gain Kp and to weaken the regulation of the gap to take account of the stability conditions of all of the two regulation loops involved; to guarantee the stability of the process, a mediocre lateral accuracy and a reduced machining efficiency must then be accepted.

Figure 4:
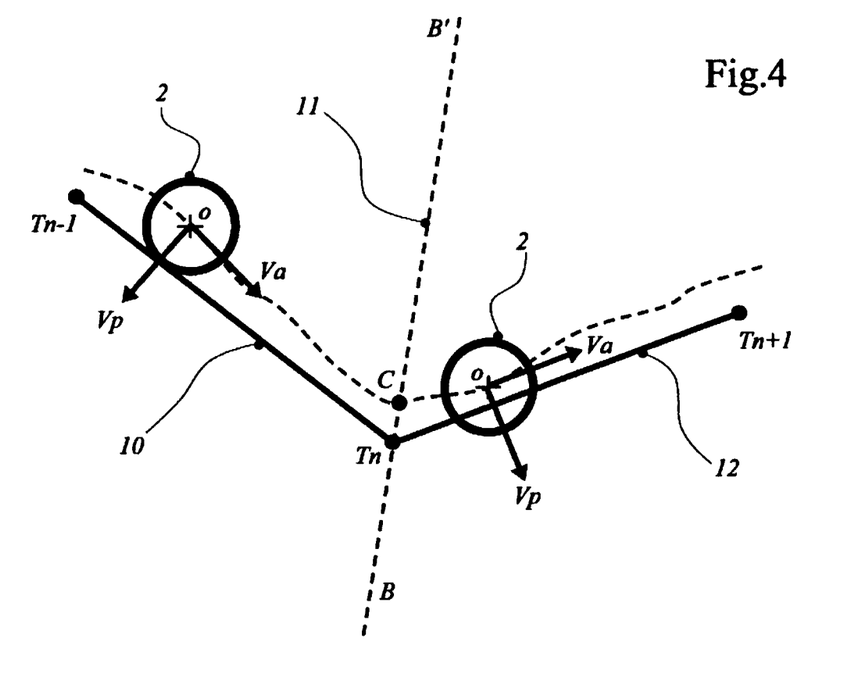
FIG. 4 is a horizontal cross section of a tool electrode of cylindrical shape which approximately follows a nominal trajectory formed by two segments; the figure highlights the bisecting line between said two segments.

With reference to FIG. 4, the trajectory changes direction from one segment 10 to the next 12, these two successive segments of the Nominal Trajectory form a more or less acute angle. The bisecting line 11 of said angle is the Inter-Segment Bisecting Line contained within the plane formed by said two successive segments; it constitutes a boundary which can be used to reorient the various Control Vectors in real time and to recalculate their associated moduli, in the transition from one trajectory segment to the next. Upon abrupt changes of direction, collisions that are fatal for the tool may occur if the crossing of said boundary is not monitored. Consequently, when the axis of symmetry of the tool, symbolized by the tool centre O in FIG. 4, crosses the Inter-Segment Bisecting Line 11 at the point C, the Control Vectors are reoriented according to the indications contained in the next block 12 and their associated scalars are recalculated. In other words, during changes of direction itemized by the Nominal Trajectory, the control vectors are reoriented, their associated scalars are recalculated, when the axis of symmetry of the tool crosses the Inter-Segment Bisecting Line formed by the current trajectory segment and the next trajectory segment.

Figure 5A:
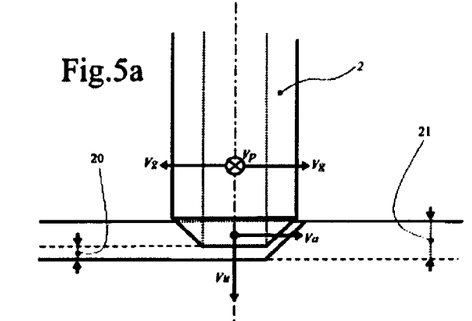
FIGS. 5a, 5b, 5c use three perpendicular views to illustrate a first execution mode of the invention.
Figure 5B:
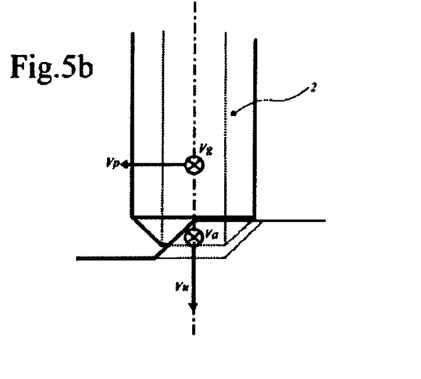
Figure 5C:
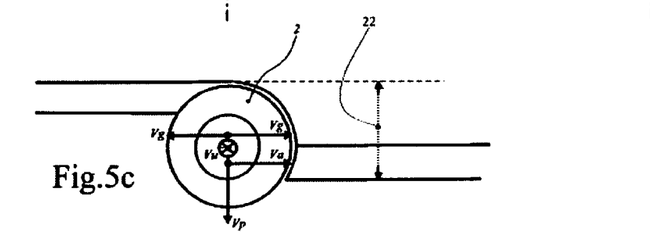

With reference to FIGS. 5a, 5b and 5c, we will now describe a first execution mode of the invention. This is a roughing machining case in which the tool 2 machines a layer 21 that is relatively thick relative to the machining gap 20. The tubular tool acquires a truncated core shape tapered close to 45°. The view 5c in the direction of its axis shows that the tool machines a lateral outtake 22 less than its diameter. It is possible to imagine that the ideal gap vector, attached to the centre of gravity of the place where material is being removed and not represented in the figures, does not point in the same direction as the advance on the trajectory. However, in the interests of simplifying the processing, a decision is made to orient the effective Gap Vector Vg differently from the ideal orientation, in other words make it point parallel to the Nominal Trajectory and perpendicularly to the axis of the tool. Experience shows that the machining stability does not deteriorate for lateral outtakes 22 that are not too small relative to the diameter of the tool.

Consequently, a fairly simple conformation of the control vectors is obtained, which is stated as follows:

the Advance Vector Va points in a direction parallel to the trajectory, the Wear Vector Vu points in a direction parallel to the axis of symmetry of the tool and perpendicular to Va, the Gap Vector Vg points in the same direction as Va, the Position Vector Vp points in a direction perpendicular to Va, Vu and Vg.

Such an arrangement ensures, as already described above, that the correction of the Position Error does not include any component parallel to the Gap Vector, but also that the regulation loops for advance along the trajectory on the one hand and wear on the other hand do not interfere with one another since the vectors Va and Vu are perpendicular. These last two loops are characterized by a dynamic rate significantly less than that of the gap and position regulation loops but they may interfere with one another. This is why Va and Vg may be permitted to be oriented in one and the same direction, but it is preferable to orient the vectors Va and Vu in directions perpendicular to one another. However, the condition "Va perpendicular to Vu" is optional. It is perfectly possible to image inclining the axis of the tool differently relative to the trajectory, although such a conformation of the control vectors does not a priori provide any substantial advantage. In practice, the use of a tubular tool, in this roughing case, requires Va and Vu to be perpendicularly oriented to obtain a flat machined surface.

Figure 6A:
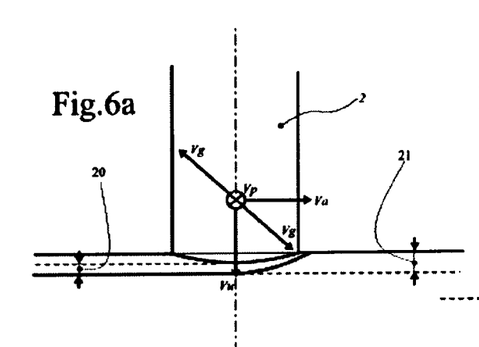
FIGS. 6a, 6b, 6c use three perpendicular views to illustrate a second execution mode of the invention.
Figure 6B:
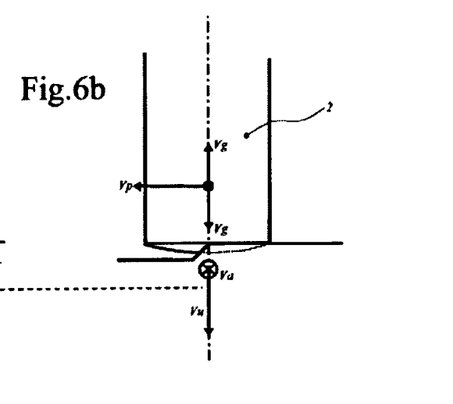
Figure 6C:
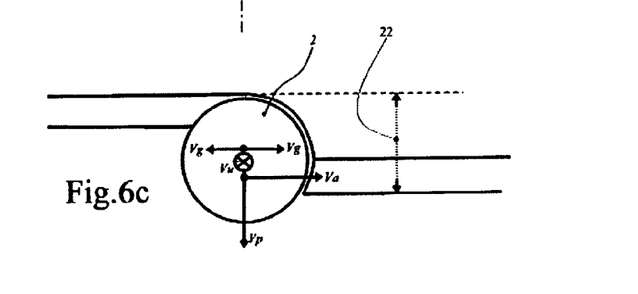

With reference to FIGS. 6a, 6b and 6c, we will now describe a second execution mode of the invention. This is a semi-finishing machining case, in which the tool 2 machines a layer 21 whose thickness is close to, but greater than, that of the machining gap 20. The cylindrical tool has a truncated cone shape that is very flattened at the end.

The ideal gap vector, attached to the centre of gravity of the place where material is being removed, as may be imaged according to FIG. 6a, points strongly downward. Orienting the effective Gap Vector Vg perpendicularly to the axis of the tool results in a loss of control. This is why it is advantageous in this case to orient it in an intermediate direction between the vectors Va and Vu, for example; still in the interests of simplifying the processing, a choice may be made to orient Vg in the plane (Va, Vu) at 45° from Va and from Vu.

Consequently, the following conformation of the control vectors is obtained:

the Advance Vector Va points in a direction parallel to the trajectory, the Wear Vector Vu points in a direction parallel to the axis of symmetry of the tool and perpendicular to Va, the Gap Vector Vg is parallel to the plane (Va, Vu) and points in an intermediate direction between Va and Vu preferably at 45° from Va and from Vu, the Position Vector Vp points in a direction perpendicular to Va, Vu and Vg.

Such an arrangement gives rise to the same comments and provides the same advantages as the preceding mode, but with additional security: the correction of the position error does not include any component parallel to the Advance Vector Va; there does, however, remain a risk of collision in this direction, and it must be eliminated.

It should be noted, as in the preceding mode, that the Gap Vector Vg comprises components in the same direction as the vectors Va and/or Vu. The risk of interference is dispensed with by the fact that the dynamic rate of the advance speed and wear regulation loops are significantly less than that of the gap regulation loop.

Figure 7A:
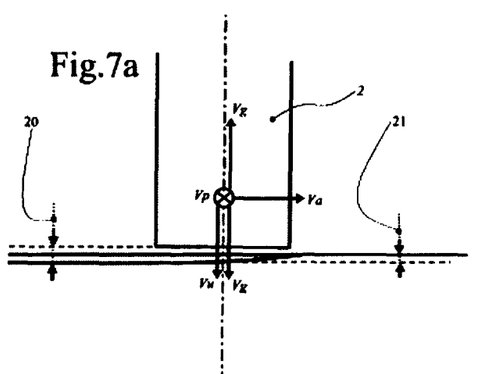
FIGS. 7a, 7b, 7c use three perpendicular views to illustrate a third execution mode of the invention.
Figure 7B:
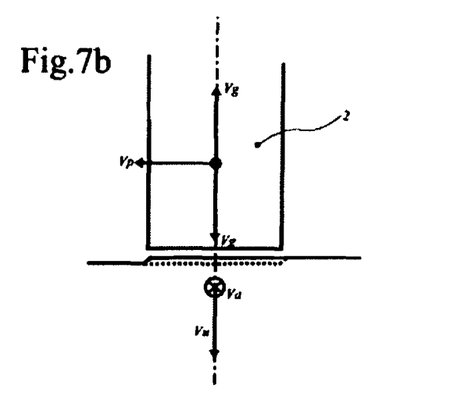
Figure 7C:
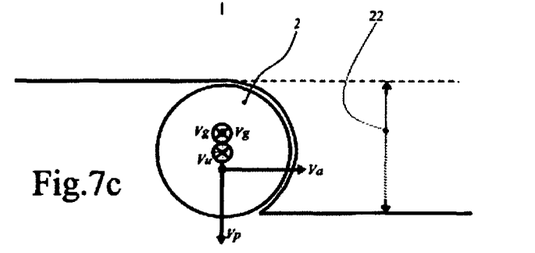

Referring to FIGS. 7a, 7b and 7c we will now describe a third execution mode of the invention. This concerns a finishing machining case in which the tool 2 machines a layer 21, the thickness of which is less than or equal to that of the machining gap 20. The cylindrical tool has lost its truncated cone shape typical of the preceding two execution modes: its end is flat.

The ideal gap vector, attached to the centre of gravity of the place where material is being removed, as may be imagined according to FIG. 7a, no longer includes any component parallel to the trajectory. Orienting the effective Gap Vector Vg in the plane (Va, Vu) at 45° from Va and from Vu once again makes it possible to retain control. However, it is clearly preferable in this case to orient it in a direction parallel to Vu.

Consequently, the following conformation of the control vectors is obtained:

the Advance Vector Va points in a direction parallel to the trajectory, the Wear Vector Vu points in a direction parallel to the axis of symmetry of the tool and perpendicular to Va, the Gap Vector Vg points in the same direction as Vu, the Position Vector Vp points in a direction perpendicular to Va, Vu and Vg.

Such an arrangement makes it possible to perform surface treatments with sweep speeds that are rare in the field of spark erosion, at around 20 mm/s. This increase in performance is due notably to the fact that it is possible to push to the maximum the gain of the gap regulation loop. Also, it may seem in this mode that the risk of collision has disappeared; this is not exactly true; this risk exists in turns if the control vector orientation transitions are not handled correctly.

In the case where the volumetric wear rate is low, according to particular settings of the machine, for example a few %, it is possible to envisage forcing to zero the scalar Mu associated with the vector Vu. The compensation for the wear is then provided by the gap regulation loop. Consequently, the scalar Mg associated with the vector Vg no longer strictly has a zero average.

It should be noted that this third execution mode, typical of thin layers, is nevertheless effective in cases similar to that illustrated by FIGS. 6a, 6b and 6c.

Figure 8:
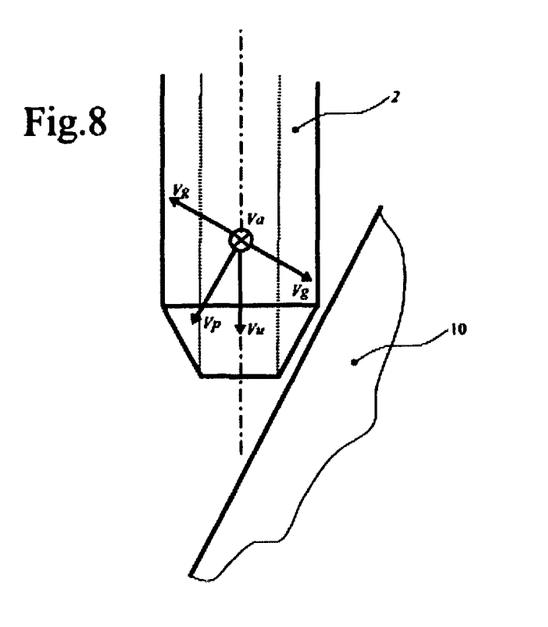
FIG. 8 uses a vertical cross section perpendicular to the advance of the tool to illustrate a fourth execution mode of the invention.

Referring to FIG. 8, we will now describe a fourth execution mode of the invention. As in the preceding execution mode, this is a finishing machining case in which the tool 2 machines a relatively thin layer. However, in this fourth execution mode, the surface of the part guiding the tool is no longer virtually perpendicular to the axis of the tool, but inclined relative to the latter and guides it laterally. The shape of the tool at its end may become sharp and closely follows the shape of the part because of the heavy wear. The ideal gap vector, attached to the centre of gravity of the place where material is being removed, is virtually perpendicular to the surface of the part to be treated. Orienting the effective Gap Vector Vg in a direction parallel to the axis of symmetry of the tool, as in the preceding execution mode, once again makes it possible to retain control, insofar values of inclination of the tool relative to the surface might remain close to the normal. However, to obtain greater flexibility, we provide for the effective Gap Vector Vg to be oriented in a direction close to the normal to the surface to be processed.

Consequently, the following conformation of the control vectors is obtained:

the Advance Vector Va points in a direction parallel to the trajectory, the Wear Vector Vu points in a direction parallel to the axis of symmetry of the tool and perpendicular to Va, the Gap Vector Vg points in a direction close to the normal to the surface to be processed, the Position Vector is contained within a plane parallel to the plane (Vu, Vg) and points in a direction perpendicular to Vg.

Such an arrangement comprises the same advantages as the preceding execution mode with, furthermore, the possibility of accessing concave areas of a part where the axis of the tool cannot be oriented according to the normal to the surface.

At the limit, it is possible to conceive a simplified variant of this fourth execution mode in which the axis of the tool is parallel to the surface to be processed. In this case, the scalar Mu associated with the vector Vu must be made zero. The compensation for the wear is then provided by the gap control loop; consequently, the scalar Mg associated with the vector Vg no longer strictly has a zero average. However, it is then necessary to use only settings of the machine yielding almost zero wear.

Figure 9:
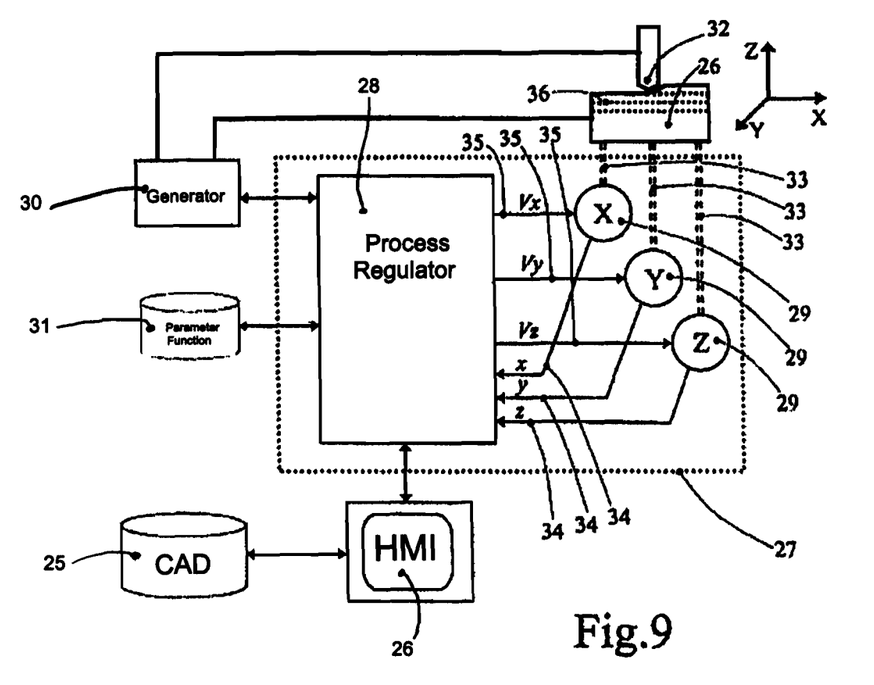
FIG. 9 is a simplified flow diagram representing the spark-erosion machining machine.

The spark-erosion machining machine according to the invention is diagrammatically represented by the flow diagram of FIG. 9. The index 25 designates the CAD (Computer Aided Design) function: it is a computer tool that can be used to draw the part to be machined 26. The machining is done in successive layers, so the CAD 25 converts the cavity to be machined into a sequence of layers 36. Each layer is in turn segmented into regions or areas, within which the CAD 25 defines a sweep travel for the point of the tool 32, 5. The sweep consists of a succession of straight-line segments 1 defined by an originating point and a terminating point. The CAD 25 therefore converts a shape to be machined into a sequence of preprogrammed trajectories, or nominal trajectories, defined within an XYZ coordinate system. In the CAD 25, the operator notably selects the tool diameters and the thickness of the layers to be machined. In FIG. 9, the CAD 25 is linked to the human-machine interface 26 (HMI) also situated upstream of the numerical control system 27. The CAD 25 is not an integral function of the spark-erosion machining machine; unlike the HMI 26 which, conventionally, is a function that enables the operator to drive this machine, create simple machining programs or modify machining programs deriving from the CAD 25, etc. The HMI 26 consists of at least a keyboard (not represented) and a screen for displaying all information concerning the machine. The numerical control system 27 of the spark-erosion machining machine incorporates, among other things, the process regulator functions 28 (or machining regulator) and a number of axis regulators 29. The process function regulator 28 implements specific software designed to manage the various machining modes according to the invention. For simplicity, FIG. 9 symbolically represents, under the index 29, only three axis regulators X, Y and Z. Said regulators conventionally consist, for example, of a motor and its tachometer for measuring the actual speed reached and a digital rule for measuring the actual position reached on the axis. The process regulator 28 is connected to two other conventional functions of the spark-erosion machining machine: machining generator 30 and technological parameters 31. The generator function 30 makes the electrical pulses needed for the machining and relays to the process regulator 28 the relevant information concerning the progress of the machining, such as gap measurements and machining efficiency measurements; the latter information is used to evaluate the actual removal of material from the part 26 and/or the tool electrode 32. The parameter function 31 is a memory containing the technological parameters specific to spark erosion. Conventionally, the operator uses the HMI 26 to assign particular machining parameters to trajectory elements.

The axis regulators 29 move the part 26 to be machined and/or the tool electrode 32 via a mechanical assembly consisting of screws, sliders, gears, work tables, mandrel, etc., symbolically represented with the index 33.

Upstream of the numerical control system 27, there are therefore two functions, the CAD 25 and the HMI 26, that enable the operator of the spark-erosion machining machine to select the appropriate machining mode, from the various execution modes of the invention. The operator therefore has to define the orientation of the four Control Vectors Va, Vg, Vu, Vp, in the most comprehensive execution modes of the invention; two vectors Vg, Vp in the simplified modes.

The process regulator 28, collaborating with the numerical control system 27, processes these four vectors Va, Vg, Vu, Vp, in the following manner to form a set of commands Vx, Vy, Vz, that can be used to activate the axis regulators 29.

Referring to FIG. 2, the tool centre O, in its displacement in the vicinity of the trajectory segment DA, registers, in each computation loop, a Position Error OP relative to the theoretical point P as defined by the theoretical schedule entered in the Nominal Trajectory 1. The real position of the point O is acquired via real-time information x,y,z representing the positions reached 34 by the axes of the machine; this information is produced by the axis regulators 29.

As already mentioned, the four Control Vectors Va, Vg, Vu, Vp, that is to say Advance Vector, Gap Vector, Wear Vector and Position Vector, are four unitary vectors that orient four independent regulation actions in the coordinate system XYZ. The amplitude of each regulation action is determined respectively by four associated scalars Ma, Mg, Mu, Mp. Starting from this principle, and using elementary vector computation methods, the following operations (from A to G) are performed in real time, that is to say at the time of each computation loop:

A) the position error vector OP is projected onto the Position Vector Vp; said projection, which is the vector OH' in FIG. 2, is used to calculate the scalar Mp associated with Vp according to the formula Mp=Kp·[OH'], in which [OH'] is the modulus of the vector OH' and Kp the gain of the position error correction loop.

B) In light of the measurements made by a conventional sensor connected to the terminals of the machining gap and incorporated in the machining generator 30, the process regulator 28 calculates the scalar Mg=Kg·Gap, associated with the gap vector Vg, in which Kg is the regulation gain of the gap correction loop and in which "Gap" is a measurement of the real gap.

C) The scalar Ma, associated with the advance vector Va, is calculated according to the duty speed value contained in the current block of the Nominal Trajectory. This speed value can be modulated by a command from the operator via the HMI 26 or by an automatic routine governed by local machining conditions.

D) The scalar Mu, associated with the wear vector Vu, is calculated according to a measurement of the efficiency of the machining. Since the length of the tool is likely to decrease, the product (Mu·Vu) makes it possible to reposition the point O in the coordinate system XYZ. For more details concerning the evaluation of the wear of the tool using information supplied by the machining generator 30, see: Philip Bleys, Electrical discharge milling, technology and tool wear compensation, PhD thesis 2003, K. U. Leuven, Dept. of Mech. Engineering.

E) The vector sum of the four independent regulation actions Ma·Va+Mg·Vg+Mu·Vu+Mp·Vp constitutes a resultant vector V.

F) According to a conventional method, the resultant vector V is projected onto each of the axes XYZ of the coordinate system of the machine so as to deliver a set of commands 35, Vx, Vy, Vz, to each of the axis regulators 29, the quantities Vx, Vy, Vz being scalars representing duty speed values.

G) Any crossing of the inter-segment bisecting line 11 is detected.

In a simplified execution mode of the invention, only two Control Vectors are defined: Vg, Vp, Gap Vector and Position Vector.

Similarly, the process regulator 28, collaborating with the numerical control system 27, processes these two vectors to form a set of commands 35 with which to activate the axis regulators 29.

The amplitude of each of the two regulation actions is determined respectively by two associated scalars Mg, Mp. The following operations (from A' to E') are performed in real time, that is to say at the time of each computation loop:

A') To calculate the scalar Mp, the projection onto the Position Vector Vp of the position error vector OP is multiplied by Kp which is the gain of the position error correction loop.

B') The measurement of the gap, delivered by the machining generator 30, enables the process regulator 28 to calculate the scalar Mg=Kg·Gap, associated with the Gap Vector Vg, in which Kg is the regulation gain of the gap correction loop.

C') The vector sum of the two independent regulation actions Mp·Vp+Mg·Vg constitutes a resultant vector V.

D') According to a conventional method, the resultant vector V is projected onto each of the axes XYZ of the machine coordinate system, so as to deliver a set of commands 34, Vx, Vy, Vz, etc. to each of the axis regulators 29, the quantities Vx, Vy, Vz being scalars representing duty speed values.

E') Any crossing of the inter-segment bisecting line 11 is detected.

The execution modes and variants described hereinabove are in no way limiting; they will accept any modifications that may be desirable in the context defined by the independent claims.

In particular, the spark-erosion machining machine could include one or more rotary axes. In these conditions, the resultant vector V, which is the vector sum of the independent regulation actions, is not simply projected onto each of the linear axes X,Y,Z of the machine coordinate system. Using known calculation methods, it will be necessary to perform real-time transformations of more complex coordinates.

In the explanation hereinabove, the axis regulators 29 receive commands by mean of duty speed values 35 obtained from the process regulator 28. Some axis regulators do not include speed input; in this case, they must be controlled positionwise. Such a variant can be envisaged, but narrows the bandwidth.

The invention clamed is:

1. Method for spark-erosion machining for spark-erosion machining machine implementing comprising the steps of:
   providing a tool electrode and an electrically conductive workpiece which are spaced from each other to form a machining gap within which a multitude of erosive electrical discharges are generated;
   providing a dielectric medium present within the machining gap, wherein said tool electrode is of cylindrical or tubular shape and is moved along a number of axes of the machining machine relative to the machining edge;
   providing a process regulator;
   providing a numerical control system controlling the displacements of the tool electrode with respect to the axes of the machining machine; and
   providing a Nominal Trajectory of the tool electrode defined by a computer file consisting of a succession of linear segments defined relative to a part coordinate system (XYZ), this Nominal Trajectory defining the movement of the tool electrode relative to the part as it ought to proceed if no disturbance were to occur during the machining, moving the tool electrode relative to the workpiece along the nominal trajectory,
   wherein information contained in the Nominal Trajectory defines at least two control vectors (Vg, Vp) which orient, within the part coordinate system, at least two independent regulation movements,
   the first of said control vectors, or Gap Vector (Vg), defining the direction in which the numerical control system must perform a first regulation movement of the axes of the machining machine to maintain the removal of material,
   the second of said control vectors, or Position Vector (Vp), defining the direction in which the process regulator must perform a second regulation movement of the axes of the machining machine to correct a tool electrode position error relative to the Nominal Trajectory, the respective amplitudes of the regulation movements being calculated in real time by the process regulator and used to adjust the nominal trajectory.

2. Method according to claim 1, wherein the Position Vector (Vp) does not include any vector component parallel to the Gap Vector (Vg) and vice versa.

3. Method according to claim 1, wherein a Wear Vector (Vu) makes it possible to perform a third regulation movement intended to compensate for the wear of the tool, its definition being taken from the Nominal Trajectory.

4. Method according to claim 3, wherein scalars (Mg, Mp, Mu, Ma) respectively associated with the Gap Vector, Position Vector, Wear Vector, and an Advance Vector, determine the respective amplitude of each of the regulation movements oriented by said control vectors, said scalars being calculated in real time by the process regulator in conjunction with the numerical control system.

5. Method according to claim 3, wherein an Advance Vector (Va), orients the action of advancing the tool parallel to the Nominal Trajectory.

6. Method according to claim 5, wherein the Advance Vector (Va) points in a direction parallel to the trajectory,
   the Wear Vector (Vu) points in a direction parallel to the axis of symmetry of the tool and perpendicular to the Advance Vector (Va),
   the Gap Vector (Vg) is parallel to the Advance Vector, Wear Vector (Va , Vu) plane and points in an intermediate direction between these two vectors preferably at 45° from the Advance Vector (Va) and from the Wear Vector (Vu).

7. Method according to claim 5, wherein the Advance Vector (Va) points in a direction parallel to the trajectory of the tool electrode,
   the Wear Vector (Vu) points in a direction parallel to the axis of symmetry of the tool and perpendicular to the Advance Vector (Va),
   the Gap Vector (Vg) points in the same direction as the Advance Vector (Va),
   the Position Vector (Vp) points in a direction perpendicular to the Advance Vector (Va), to the Wear Vector (Vu) and to the Gap Vector (Vg).

8. Method according claim 7, wherein the axis of symmetry of the tool electrode is no longer perpendicular but inclined relative to the trajectory and to the Advance Vector (Va).

9. Method according to claim 5, wherein the Advance Vector (Va) points in a direction parallel to the Nominal Trajectory,
the Wear Vector (Vu) points in a direction parallel to the axis of symmetry of the tool and perpendicular to the Advance Vector (Va),
the Gap Vector (Vg) points in a direction close to the normal to the surface to be processed,
the Position Vector (Vp) is contained in a plane parallel to the Wear Vector, Gap Vector (Vu, Vg) and points in a direction perpendicular to the Gap Vector (Vg).

10. Method according to claim 9, wherein the axis of the tool electrode is substantially parallel to the surface to be processed, in which case the scalar (Mu) associated with the Wear Vector (Vu) is forced to zero, the compensation for the wear being provided by the first regulation movement defined by the Gap Vector (Vg).

11. Method according to claim 5, wherein the Advance Vector (Va) points in a direction parallel to the Nominal Trajectory,
the Wear Vector (Vu) points in a direction parallel to the axis of symmetry of the tool and perpendicular to the Advance Vector (Va),
the Gap Vector (Vg) points in the same direction as the Wear Vector (Vu),
the Position Vector (Vp) points in a direction perpendicular to the Advance, Wear and Gap Vectors (Va, Vu, Vg).

12. Method according to claim 11, wherein, in the case where the volumetric wear rate is low, according to particular settings of the machine, the scalar (Mu) associated with the Wear Vector (Vu) is forced to zero, the compensation for the wear being provided by the first regulation movement defined by the Gap Vector (Vg).

13. Method according to claim 1, wherein, during changes of direction itemized by the Nominal Trajectory, the control vectors are, where appropriate, reoriented and their associated scalars recalculated, when the axis of symmetry of the tool electrode crosses the Inter-Segment Bisecting Line formed by the current trajectory segment and the next trajectory segment.

14. Spark-erosion machining machine comprising:
a tool electrode and an electrically conductive workpiece which are spaced from each other to form a machining gap within which a multitude of erosive electrical discharges are generated, constituting a machining edge which is displaced according to the movements of the tool electrode,
a dielectric medium present within the machining gap,
said tool electrode being of cylindrical or tubular shape, moved along a number of axes of the machining machine relative to the machining edge,
a process regulator incorporated in a numerical control system, making it possible to control the displacements of the tool electrode with respect to the axes of the machining machine by means of axis regulators,
a Nominal Trajectory for the tool electrode defined by means of a computer file consisting of a succession of linear segments defined relative to a part coordinate system (X,Y,Z), this Nominal Trajectory describing the movement of the tool electrode relative to the part as it ought to proceed if no disturbance were to occur during the machining, and
means for using information contained in the Nominal Trajectory to define at least two control vectors (Vg, Vp) which orient in the coordinate system (X,Y,Z) at least two independent regulation movements,
the first of said control vectors, or Gap Vector (Vg), defining the direction in which the machining regulator must perform a first regulation movement of the axes of the machining machine designed to maintain the removal of material,
the second of said control vectors, or Position Vector (Vp), defining the direction in which the machining regulator must perform a second regulation movement of the axes of the machining machine to correct a tool electrode position error relative to the Nominal Trajectory, the respective amplitudes of the regulation movements being calculated in real time by the process regulator.

15. Spark-erosion machining machine according to claim 14, wherein the Position Vector (Vp) does not include any vector component parallel to the Gap Vector (Vg) and vice versa.

16. Spark-erosion machining machine according to claim 14, further including two scalars (Mp, Mg) which determine the amplitude of each of the at least two independent regulation actions, calculates the vector sum of said regulation actions (Mp·Vp+Mg·Vg) constituting a resultant vector (V) projected onto each of the axes (XYZ) of the machine coordinate system, so as to deliver a set of commands (Vx, Vy, Vz) to each of the axis regulators.

17. Spark-erosion machining machine according to claim 16, including using information from the Nominal Trajectory, to define a third control vector, or Wear Vector (Vu), this vector making it possible to perform a third regulation movement intended to compensate for the wear of the tool.

18. Spark-erosion machining machine according to claim 17, wherein a fourth control vector, or Advance Vector (Va), orients the action of advancing the tool parallel to the Nominal Trajectory.

19. Spark-erosion machining machine according to claim 18, wherein scalars (Mg, Mp, Mu, Ma) respectively associated with the Gap Vector, Position Vector, Wear Vector, Advance Vector, determine the respective amplitude of each of the regulation movements oriented by said control vectors, said scalars being calculated in real time by the process regulator in conjunction with the numerical control system.

20. Spark-erosion machining machine according to claim 18, wherein the Advance Vector (Va) points in a direction parallel to the trajectory,
the Wear Vector (Vu) points in a direction parallel to the axis of symmetry of the tool and perpendicular to the Advance Vector (Va),
the Gap Vector (Vg) is parallel to the Advance Vector, Wear Vector (Va, Vu) plane and points in an intermediate direction between these two vectors preferably at 45° from the Advance Vector (Va) and from the Wear Vector (Vu).

21. Spark-erosion machining machine according to claim 18, wherein the Advance Vector (Va) points in a direction parallel to the trajectory of the tool electrode,
the Wear Vector (Vu) points in a direction parallel to the axis of symmetry of the tool and perpendicular to the Advance Vector (Va),
the Gap Vector (Vg) points in the same direction as the Advance Vector (Va),
the Position Vector (Vp) points in a direction perpendicular to the Advance Vector (Va), to the Wear Vector (Vu) and to the Gap Vector (Vg).

22. Spark-erosion machining machine according to claim 21, wherein the axis of symmetry of the tool is not perpendicular but inclined relative to the trajectory and to the Advance Vector (Va).

23. Spark-erosion machining machine according to claim 18, wherein the Advance Vector (Va) points in a direction parallel to the Nominal Trajectory,
the Wear Vector (Vu) points in a direction parallel to the axis of symmetry of the tool and perpendicular to the Advance Vector (Va),
the Gap Vector (Vg) points in a direction close to the normal to the surface to be processed,
the Position Vector (Vp) is contained within a plane parallel to the Wear Vector, Gap Vector (Vu, Vg) plane and points in a direction perpendicular to the Gap Vector (Vg).

24. Spark-erosion machining machine according to claim 23, wherein the axis of the tool electrode is substantially parallel to the surface to be processed, in which case the scalar (Mu) associated with the Wear Vector (Vu) is forced to zero, the compensation for the wear being provided by the first regulation movement defined by the Gap Vector (Vg).

25. Spark-erosion machining machine according to claim 18, wherein the Advance Vector (Va) points in a direction parallel to the Nominal Trajectory,
the Wear Vector (Vu) points in a direction parallel to the axis of symmetry of the tool and perpendicular to the Advance Vector (Va),
the Gap Vector (Vg) points in the same direction as the Wear Vector (Vu),
the Position Vector (Vp) points in a direction perpendicular to the Advance, Wear and Gap Vectors (Va, Vu, Vg).

26. Spark-erosion machining machine according to claim 25, wherein, in the case where the volumetric wear rate is low, according to particular settings of the machine, the scalar (Mu) associated with the Wear Vector (Vu) is forced to zero, the compensation for the wear being provided by the first regulation movement defined by the Gap Vector (Vg).

27. Spark-erosion machining machine according to claim 14, wherein the Control Vectors are, where appropriate, reoriented and their associated scalars recalculated, during changes of direction itemized by the Nominal Trajectory, when the axis of symmetry of the tool electrode crosses the Inter-Segment Bisecting Line formed by the current trajectory segment and the next trajectory segment.

28. Spark-erosion machining machine according to claim 14, wherein the numerical control system comprises a number of axis regulators equipped in such a way as to be controlled by means of duty speed values (Vx, Vy, Vz).

29. Spark-erosion machining machine according to claim 28, wherein the means comprises a process regulator which manages four unitary Control Vectors, Advance Vector, Gap Vector, Wear Vector and Position Vector (Va, Vg, Vu, Vp), which orient four independent regulation actions, the amplitude of each regulation action being determined respectively by four associated scalars (Ma, Mg, Mu, Mp), characterized in that the vector sum of said regulation actions (Ma·Va+Mg·Vg+Mu·Vu+Mp·Vp) constitutes a resultant vector (V) which is projected onto each of the axes (X,Y,Z) of the machine coordinate system so as to deliver a set of commands (Vx, Vy, Vz) to each of the axis regulators.

* * * * *